UNITED STATES PATENT OFFICE.

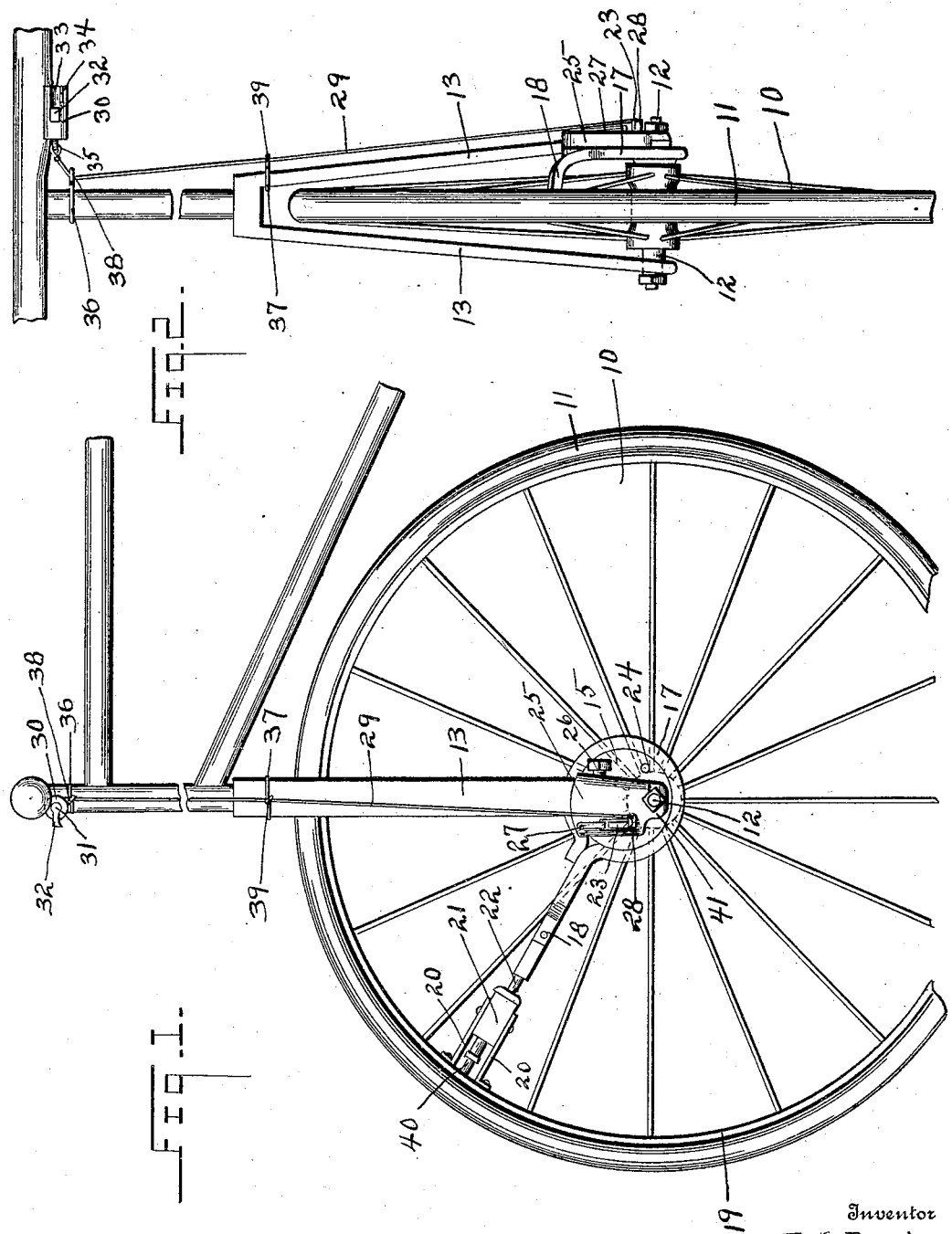

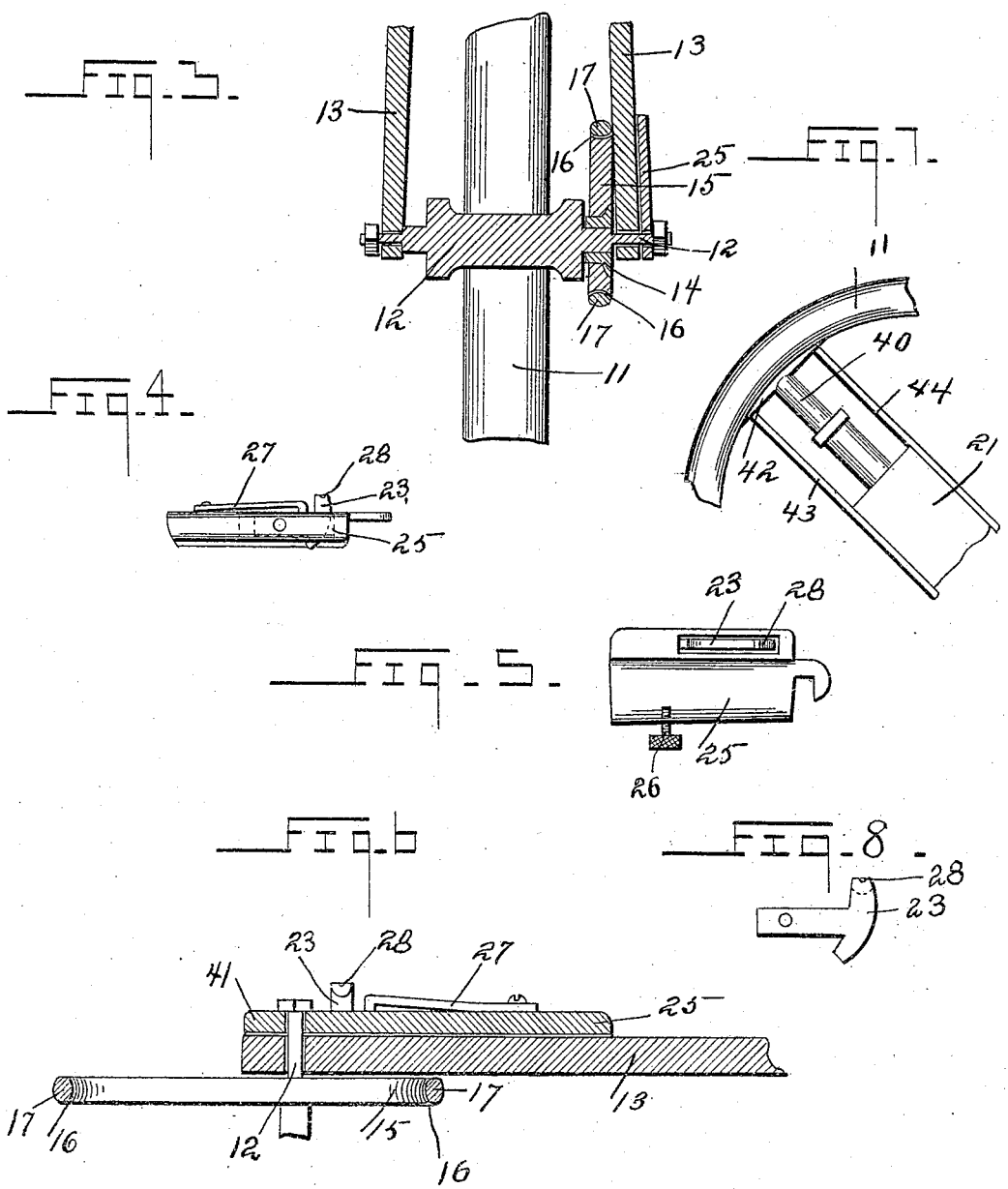

ERB REED, OF COOKEVILLE, TENNESSEE, ASSIGNOR TO SHEALIE R. REED, OF COOKEVILLE, TENNESSEE.

AUTOMATIC AIR-PUMP.

940,892.  Specification of Letters Patent.  Patented Nov. 23, 1909.

Application filed May 23, 1908. Serial No. 434,602.

*To all whom it may concern:*

Be it known that I, ERB REED, a citizen of the United States, residing at Cookeville, in the county of Putnam and State of Tennessee, have invented certain new and useful Improvements in Automatic Air-Pumps, of which the following is a specification.

This invention relates to pumps and has especial reference to that class which are employed in inflating vehicle tires.

An object of this invention is the provision of a pump that can be applied to a bicycle wheel with great readiness or to a vehicle wheel of any description upon which is mounted a pneumatic tire.

Another object of the invention is to provide a means whereby the pump may be thrown into or out of operation from the handle bars of the bicycle.

A further object of the invention is to provide a device of this character for a bicycle which will be strong and durable and which will be compact, having but little weight and occupying but little room.

Other objects and advantages will be apparent from the following description and it will be understood that changes in the specific structure shown and described may be made within the scope of the claim without departing from the spirit of the invention.

In the drawings forming a portion of the specification, and in which like numerals of reference indicate similar parts in the several views, Figure 1 is a side elevation of the device applied to the front wheel and frame of a bicycle, Fig. 2 is an end elevation of the same, Fig. 3 is a transverse cross section through the axle of the wheel and forks of the bicycle, Fig. 4 is an edge view of the pawl carrying plate, Fig. 5 is a rear view of the plate, Fig. 6 is a cross section of the plate as applied to the forks of a bicycle. Fig. 7 is a detailed view of the pump as applied to the wheel. Fig. 8 is a detailed view of the locking pawl employed in connection with this apparatus.

Referring now more particularly to the drawings, 10 designates a bicycle wheel having a tire 11 disposed thereon which is mounted upon an axle 12 supported in the lower ends of the forks 13. Detachably supported upon one end of the axle 12 is a cone 14 which is adapted to be disposed between the fork 13 and the wheel 10 and to support loosely thereon an eccentric 15. The eccentric 15 carries a peripheral groove 16 in which rides a loosely mounted strap 17 which carries the lower end of a radially extending arm 18. The arm 18 extends radially from the strap 17 for a short distance and then is carried inwardly centrally of the wheel 10 where it extends outwardly toward the rim 19 of the wheel 10. Two parallel rods 20 extend centrally from the inner face of the rim 19 and support upon their inner ends a suitable pump 21 having a piston 22 which is pivoted at its outer end to the outer extremity of the arm 18. The outer face of the eccentric is furnished with a recess 24 for the reception of a pawl 23. The pawl 23 is carried near one edge of a plate 25 which is clamped upon one of the forks 13 and held in position by the set screw 26 and by the projection 41 extending downwardly and engaging the outer end of the axle 12. The pawl 23 is longitudinally pivoted in the plate 25 and is normally pressed into engagement with the eccentric, being adapted to engage in the recess 24, under the tension of a spring 27. An outward projection is provided upon the pawl 23 having in its outer end an eye 28 which is adapted to be secured to the lower end of a connecting cord 29 for the purpose of withdrawing the pawl 23 from engagement in the recess 24. A casing 30 is disposed upon the handle bar as shown, although the position is immaterial, in which is fitted a sliding bolt 31 having a laterally projecting arm 32 which projects through a longitudinal slot 33 of the casing 30 and is adapted to be positively held at one end of the slot 33 by the engagement of the arm 32 against a shoulder 34. An eye 35 is formed upon one end of the bolt 31 into which is secured the upper end of the connecting cord 29. Suitable cleats 36 and 37 are provided upon the frame carrying eyes 38 and 39 which are adapted to lead the connecting cord 29 along the frame from the pawl 23 to the bolt 31.

40 is a tube which connects the pump 21 to the tire 11.

In application and operation the cone 14 is screwed upon the axle 12 which action places the arm 18 in operative position. The plate 25 is then applied to the fork 13 and secured thereto by means of the set screw 26. The bolt 31 is then positioned and the connecting cord 29 applied. When the pump 21 is not to be used, the bolt 31 is drawn back and secured against the shoulder 34 which draws on the cord 29 and raises the pawl 25 out of engagement with the eccentric 15. The eccentric 15 will now revolve with the wheel and strap 17. To throw the pump 21 into operation the bolt 31 is released and allowed to slide to the inner end of the casing 30 and the cord 29 is also released. The spring 27 now actuates the pawl 25 and causes the same to engage in the recess 24 and lock the eccentric 15 rigidly with the fork 13. The wheel revolving carries the arm 18 and on account of the strap 17 and eccentric 15 the arm 18 is given a reciprocating motion actuating the pump piston 22 to inflate the tire 11, the air passing through the tube 40.

It may be found convenient to place a metallic plate 42 around the valve and tube 40 upon the inner face of the rim 19 for the purpose of better supporting the pump. The plate 42 is adapted to carry two parallel rods 43 and 44 which engage the sides of the pump 21 to support the same.

What is claimed is:

A device of the class described comprising a wheel and a frame carried thereby, a curved plate secured upon the rim of the wheel, arms upwardly projected from said plate, a pump carried between the arms, a tube carried centrally by said plate, and connected at its outer extremity with the pump, a piston mounted in said pump extended centrally of said wheel, an arm pivotally secured upon the inner extremity of said piston, the inner extremity of said arm being curved circularly, an eccentric disposed upon the axle of said wheel and engaged within the curved portion of said arm, a plate detachably secured to the lower extremity of the frame in juxtaposition to said eccentric, a pawl formed of spring material positioned in the outer face of said plate adapted to extend inwardly and engage at times in a recess formed in the outer face of said extremity through said eye, a cord connected with the pawl and means connected with the cord to operate said pawl.

In testimony whereof I affix my signature, in presence of two witnesses.

ERB REED.

Witnesses:
S. S. CHISHOLM,
N. J. THOMPSON.